United States Patent [19]
Kinzie

[11] Patent Number: 6,092,621
[45] Date of Patent: Jul. 25, 2000

[54] METHODS AND APPARATUS FOR SUPPRESSING ENGINE TEST CELL HOWL

[75] Inventor: Kevin W. Kinzie, Indian Springs, Ohio

[73] Assignee: General Electric Company, Cincinnati, Ohio

[21] Appl. No.: 09/342,821

[22] Filed: Jun. 29, 1999

[51] Int. Cl.$^7$ ........................................... B64F 1/26
[52] U.S. Cl. .................. 181/218; 181/217; 181/220; 181/221; 239/265.11; 239/265.13; 239/265.15; 239/265.17
[58] Field of Search ..................... 181/217, 218, 181/220, 221, 213, 212, 210, 215; 239/265.11, 265.13, 265.15, 265.17

[56] References Cited

U.S. PATENT DOCUMENTS

| | | | |
|---|---|---|---|
| 3,344,882 | 10/1967 | Bellion et al. | 181/51 |
| 3,572,464 | 3/1971 | MacDonald | 181/51 |
| 3,612,209 | 10/1971 | Vdoviak | 181/33 |
| 3,613,996 | 10/1971 | Tanner | 239/265.13 |
| 3,899,923 | 8/1975 | Teller | 73/116 |
| 4,168,763 | 9/1979 | White et al. | 181/218 |

OTHER PUBLICATIONS

Jones et al., The Acoustic Response Of Altitude Test Facility Exhaust Systems To Axisymmetric And Two–Dimensional Turbine Engine Exhaust Plumes, DGLR/AIAA 92–02–131, May, 1992.

Seiner et al., Experiments Of Shock Associated Noise On Supersonic Jets, AIAA 79–1526, Jul., 1979

*Primary Examiner*—Bentsu Ro
*Assistant Examiner*—Edgardo San Martin
*Attorney, Agent, or Firm*—Andrew C. Hess; Rodney M. Young

[57] ABSTRACT

Methods and apparatus for suppressing cell howl with negligible impact on engine test conditions are described. The apparatus, in an exemplary embodiment includes a flow distorter configured to be positioned close to a nozzle exit of an engine nozzle, and a flow distorter support for maintaining the flow distorter at a selected location. The flow distorter is adjustably secured to the support so that a distance at which a tip of the distorter is located relative to support is adjustable.

14 Claims, 3 Drawing Sheets

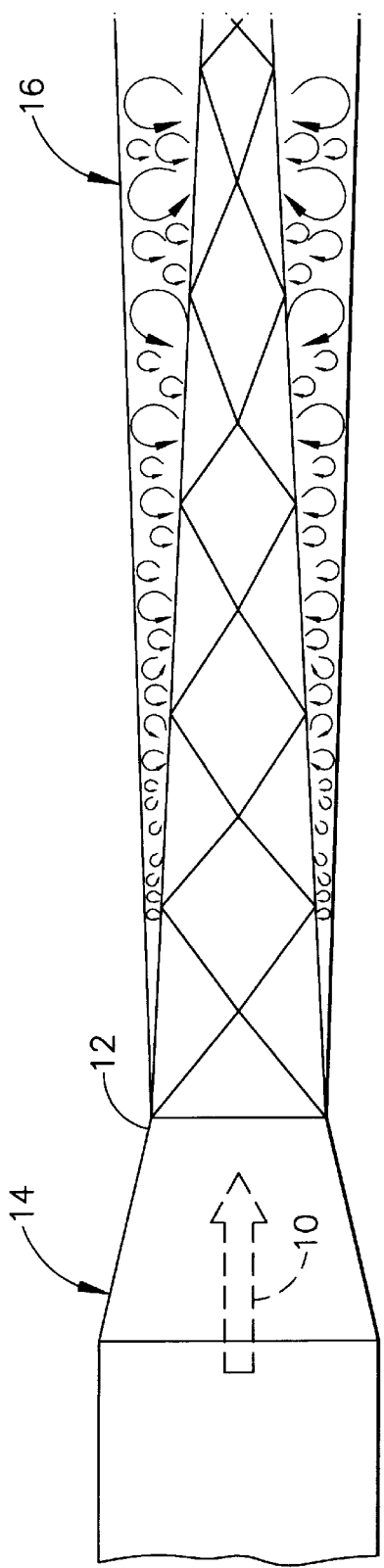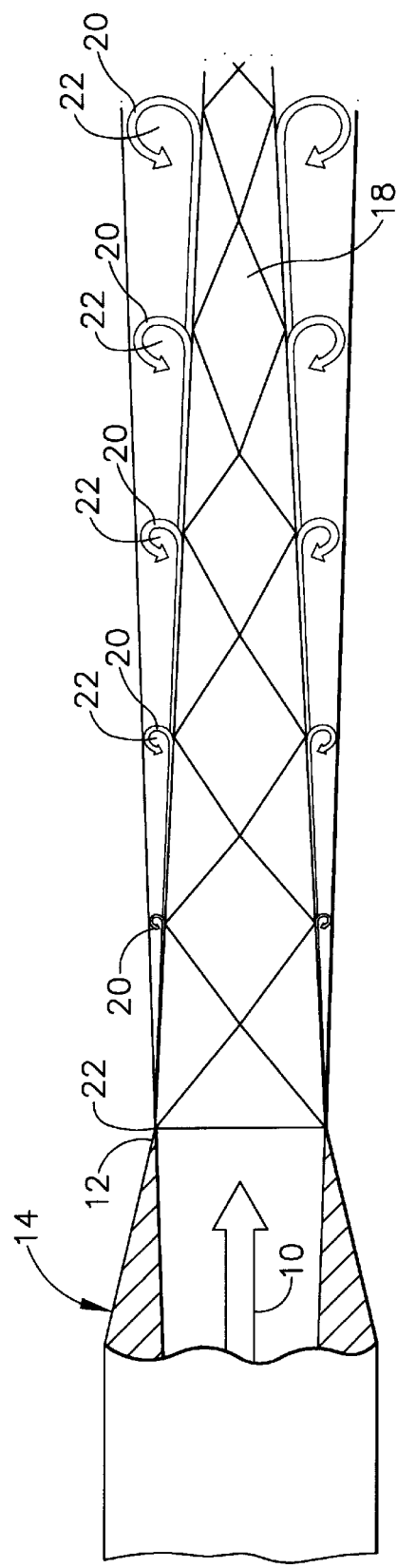

METHODS AND APPARATUS FOR SUPPRESSING ENGINE TEST CELL HOWL

GOVERNMENT RIGHTS STATEMENT

The United States Government has rights in this invention pursuant to Contract No. F33657-97-4-2059 awarded by the Department of the Air Force.

BACKGROUND OF THE INVENTION

This invention relates generally to turbine engines, and more specifically, to reducing, if not eliminating, an intense acoustic tone emitted during certain test operating conditions of such engines.

For testing, turbine engines typically are enclosed within a test cell. The test cell is sufficiently large so that the engine is completed enclosed within the cell, and test operators can move about the cell to set test parameters and check engine performance. Under certain operating conditions, and with the engine located within a test cell, an intense acoustic tone is emitted. This tone sometimes is referred to as "cell howl".

The intensity of the tone can sometimes damage the test cell and engine. Known attempts to eliminate cell howl, as described in Jones et al., The Acoustic Response Of Altitude Test Facility Exhaust Systems To Axisymmetric And Two-Dimensional Turbine Engine Exhaust Plumes, DGLR/AIAA 92-02-131, May, 1992, include attempting to optimize a location of the cell exhaust collector relative to an engine nozzle exit, injecting water in an engine exhaust plume, locating volume resonators in the cell exhaust collector, and inserting a secondary concentric duct into the exhaust collector. These known attempts have not proven one hundred percent successful in eliminating cell howl for all engine nozzles, and the howl generated by some nozzles is not even always reduced.

BRIEF SUMMARY OF THE INVENTION

The present invention, in one aspect, relates to a flow distorter apparatus which suppresses cell howl with negligible impact on engine test conditions. The apparatus, in an exemplary embodiment, includes a flow distorter configured to be positioned close to a nozzle exit of an engine nozzle, and a flow distorter support for maintaining the flow distorter at a selected location.

The flow distorter is adjustably secured to the support so that a distance at which a tip of the distorter is located relative to support is adjustable. More specifically, and in an exemplary embodiment, the support includes a base having an adjustable track to enable axial adjustment of the flow distorter relative to a nozzle exit plane. The support further includes a first support arm extending vertically from the base, and a second support arm extending angularly from the base to the first support arm. The first and second support arms are movable relative to the adjustable track and are secured thereto, for example, by bolts. Similarly, the flow distorter is secured to the first arm by a bolt, and the distorter can be adjusted relative to the first support arm so that the extent to which the distorter tip extends into the engine exhaust flow can be adjusted.

Prior to testing operation of an engine in a test cell, the distorter axial position PAP and the distorter penetration P into the engine exhaust flow is selected. The distorter should be positioned so that it has minimal, or no, impact on engine performance but suppresses, if not totally eliminates, cell howl.

The above described flow distorter apparatus is effective in reducing cell howl and is quick, easy, and inexpensive to fabricate and install in existing as well as newly fabricated test facilities. In addition, the flow distorter apparatus is external to the engine nozzle, which minimizes its impact on test measurements. By eliminating cell howl and minimizing test measurement impact, engine tests can be performed reliably and under consistent conditions, and cell howl damage is avoided.

BRIEF DESCRIPTION OF THE DRAWINGS

FIG. 1 is a schematic illustration of broadband supersonic jet noise;

FIG. 2 is a schematic illustration of a supersonic jet in a screech mode;

DETAILED DESCRIPTION OF THE INVENTION

Figure 3:
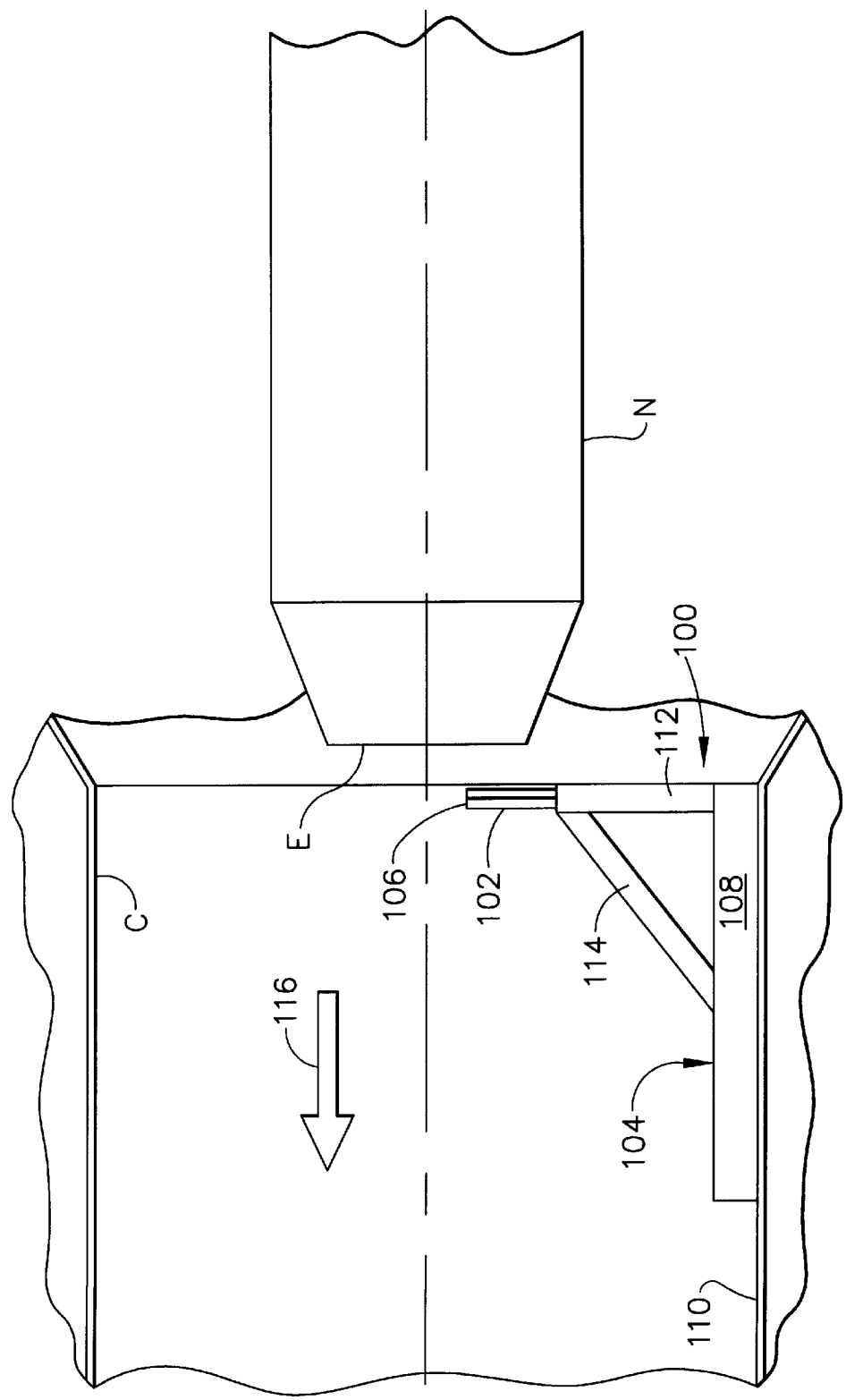
FIG. 3 is a schematic illustration of a flow distorter apparatus positioned relative to an engine nozzle.

FIG. 1 is a schematic illustration of broadband supersonic jet noise, and FIG. 2 is a schematic illustration of a supersonic jet screech mode. In the broadband noise condition, air flows in a direction 10 from an exit 12 of an engine nozzle 14. Random turbulence 16 generates noise, as shown in FIG. 1. Referring to FIG. 2, shock screech occurs when turbulence convects through a quasi-periodic shock cell system in an exhaust plume 18. Acoustic waves travel upstream to nozzle exit 12 and then generate new turbulence of the same wavelength as the acoustic waves. When the acoustic wavelength is close to the same spacing as the shock cells, a resonant feedback loop 20 is established which can produce extremely discrete and intense acoustic tones 22. These acoustic tone 22 generate cell howl.

FIG. 3 is a schematic illustration of a flow distorter apparatus 100 located in an operative position relative an engine exhaust nozzle N and a test cell exhaust collector C. Apparatus 100, as shown in FIG. 3, includes a flow distorter 102 positioned close to a nozzle exit E of nozzle N, and a flow distorter support 104 for maintaining flow distorter 102 at a selected location. Flow distorter 102 has a square cross sectional shape. Distorter 102 can, however, have many other geometric shapes, and distorter 102 does not necessarily even have to be symmetric about an axis. In addition, and in an alternative embodiment, distorter 102 includes a water passage for enabling cooling water to flow through distorter 102.

Distorter 102 is adjustably secured to support 104 so that a distance at which a tip 106 of distorter 102 is located is adjustable. More specifically, support 104 includes a base 108 which is secured to an adjustable track 110 to enable axial adjustment of flow distorter 102 relative to a nozzle exit plane. Base 108 is secured to track 110 by, for example, bolts. Support 104 further includes a first support arm 112 extending vertically from base 108, and a second support arm 114 extending angularly from base 108 to first support arm 112. Similarly, flow distorter 102 is secured to first arm 112 by a bolt, and distorter 102 can be adjusted relative to arm 112 so that the extent to which tip 106 extends into engine exhaust flow moving in a direction indicated by arrow 116 can be adjusted.

Flow distorter 102 is fabricated from stainless steel. Support 104 is fabricated from carbon steel. Of course, many different types of material can be used and the present invention is not limited to use in connection with any one particular material.

Figure 4:
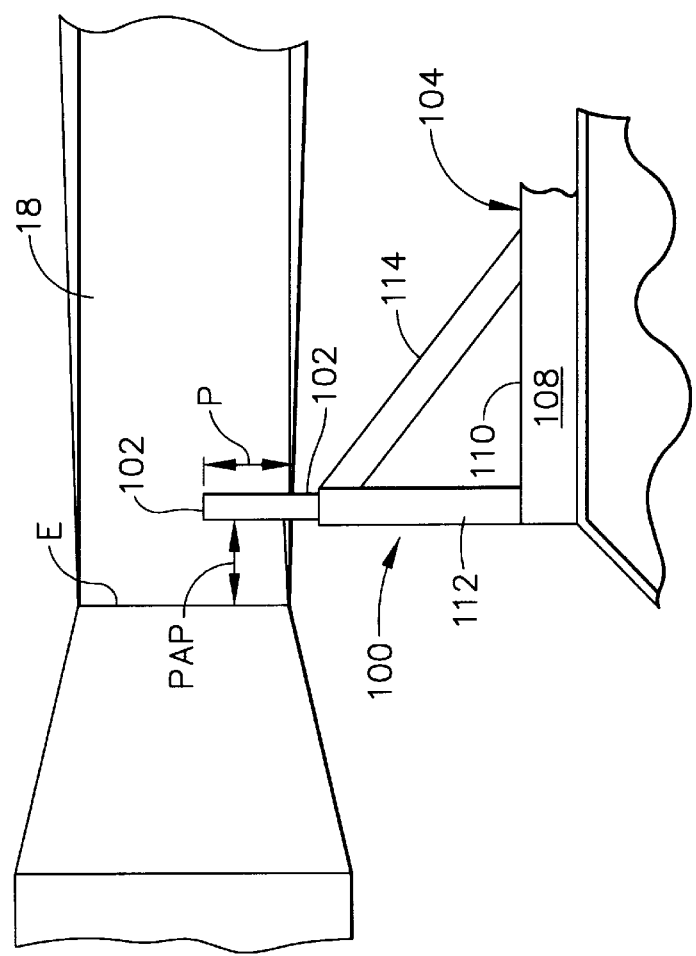
FIG. 4 which is a schematic illustration of the location of the flow distorter apparatus relative to a nozzle exit.

Prior to testing operation of an engine in a test cell, and referring now to FIG. 4 which is a schematic illustration of the location of apparatus 100 relative to nozzle exit E, distorter axial position PAP and distorter penetration P into an exhaust flow 118 are selected. Specifically, distorter axial position PAP refers to the distance from nozzle exit E to distorter 102. Distorter penetration P refers to the length of the section of distorter 102 located within, or penetrating into, engine exhaust flow 118.

The particular engine being tested, and the particular shape of distorter 102 impact the desired axial position PAP and penetration P. Distorter 102 should be positioned so that distorter 102 has no impact on engine performance but suppresses, if not totally eliminates, cell howl. In one particular test, it was empirically determined that a penetration P of 4.0 inches and position PAP of 6.9 inches provided acceptable results. Again, the engine characteristics and the distorter characteristics all may have an impact on the specific position of the distorter relative to the engine nozzle exit.

Figure 5:
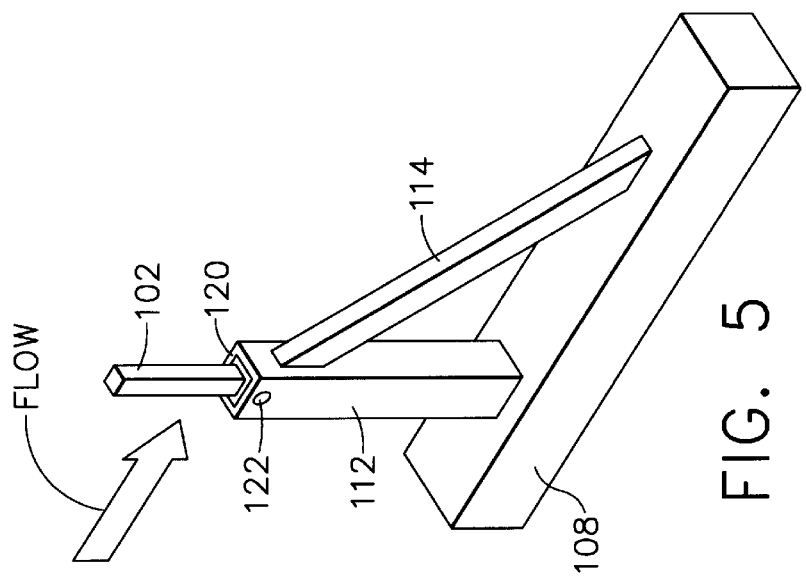
FIG. 5 is a perspective view of the flow distorter apparatus shown in FIG. 3.

FIG. 5 is a perspective view of distorter apparatus 100. As clearly shown in FIG. 5, flow distorter 102 has a square cross sectional shape and is adjustably secured to support 104. Specifically, distorter 102 extends into an opening 120 in arm 112, and an adjustment screw 122 extends through arm 112 and is tightened against distorter 102 to maintain distorter 102 in position.

Many variations of the above described flow distorter apparatus are possible. For example, the support as well as the flow distorter may have many different shapes and configurations. Also, the flow distorter may, for example, be supported from the ceiling rather than the floor of the test cell as shown in the drawings. Generally, the support performs the function of controlling the extent to which the flow distorter extends into the exhaust flow, and the axial position of the flow distorter relative to the nozzle exit. The distorter performs the function of disrupting the exhaust flow sufficiently so that cell howl is suppressed, but not to the extent of impacting engine operation. Specifically, the distorter eliminates the resonant feedback loops in the exhaust plumes, which eliminates the acoustic tones generated by such loops. Many different supports and distorters can be configured to perform these functions, and therefore, the present invention is not limited to the specific embodiments described and illustrated herein.

While the invention has been described in terms of various specific embodiments, those skilled in the art will recognize that the invention can be practiced with modification within the spirit and scope of the claims.

What is claimed is:

1. A method for suppressing cell howl in testing a turbine engine, said method comprising the steps of:
    locating a flow distorter attached to a support a selected axial distance PAP from a nozzle exit of the engine, the support adjustable to permit axial adjustments to the flow distorter of a distance PAP relative to the nozzle exit of the engine; and
    locating the flow distorter at a selected penetration P into an exhaust flow path of the engine, the support further adjustable to control the penetration P of the flow distorter into the exhaust flow path.

2. A method in accordance with claim 1 wherein the selected distance PAP and penetration P provide that the flow distorter eliminates cell howl.

3. A method in accordance with claim 1 wherein the selected distance PAP and penetration P provide that the flow distorter does not significantly impact engine test operations.

4. Apparatus for suppressing engine test cell howl, comprising:
    a flow distorter configured to be positioned at a selected distance from a nozzle exit of a turbine engine; and
    a flow distorter support for maintaining said flow distorter at a selected location, the flow distorter support adjustable to permit axial adjustments of said flow distorter relative to the nozzle exit of the engine, said flow distorter support further adjustable to permit adjustments of said flow distorter relative to the exhaust flow path.

5. Apparatus in accordance with claim 4 wherein said flow distorter comprises a water passage for cooling water to flow through said distorter.

6. Apparatus in accordance with claim 4 wherein said support comprises a base and a first support arm extending vertically from said base, said distorter adjustably secured to said first support arm.

7. Apparatus in accordance with claim 6 wherein said support further comprises a second support arm extending angularly from said base to said first support arm.

8. Apparatus in accordance with claim 4 wherein said distorter is stainless steel.

9. Apparatus in accordance with claim 4 wherein said base is carbon steel.

10. Apparatus in accordance with claim 4 wherein said distorter has a square cross sectional shape.

11. A flow distorter apparatus comprising:
    a flow distorter configured to be positioned at a selected distance from a nozzle exit of a turbine engine; and
    a flow distorter support for maintaining said flow distorter at a selected location, said distorter adjustably secured to said support, said support permitting axial adjustments of said flow distorter relative to said nozzle exit of the turbine engine and adjustments of said flow distorter relative to an amount of penetration into an exhaust flow path of the turbine engine.

12. Apparatus in accordance with claim 10 wherein said flow distorter comprises a water passage for cooling water to flow through said distorter.

13. Apparatus in accordance with claim 10 wherein said support comprises a base, a first support arm extending vertically from said base, and a second support arm extending angularly from said base to said first support arm.

14. Apparatus in accordance with claim 11 wherein said flow distorter has a square cross sectional shape.

* * * * *